United States Patent Office 3,533,908
Patented Oct. 13, 1970

3,533,908
POROUS PAPERBOARD SHEET HAVING PLASTIC MICROSPHERES THEREIN
Harold M. Hoogsteen, Kalamazoo, Mich., assignor to Brown Company, Kalamazoo, Mich., a corporation of Delaware
No Drawing. Filed May 19, 1967, Ser. No. 639,629
Int. Cl. D21d 3/00
U.S. Cl. 162—168     7 Claims

ABSTRACT OF THE DISCLOSURE

A porous paper or paperboard sheet is prepared from an aqueous slurry of paper pulp and polymeric plastic microspheres, dried, and then treated with an organic solvent to dissolve at least a portion of a number of the microspheres so as to increase the porosity substantially uniformly throughout the sheet.

---

The present invention relates to a novel paper or paperboard sheet, and is more particularly concerned with a low density paper or paperboard sheet having plastic microspheres incorporated therein.

Low density high porosity paperboard sheet is desirable for a number of applications, as for example in the production of paper cups having a low thermal conductivity. Low density high porosity paperboard sheet has in the past been produced, for example, by incorporating a foamable plastic material therein. However, such materials have been found to have several drawbacks, as for example low tensile strength and insufficient porosity.

It is an object of the present invention to provide a low density high porosity paperboard sheet which is inexpensive to produce. It is a further object to provide such a sheet having a sufficient degree of porosity so that it may be used for additional applications, such as for a filter material. It is a further object to provide a paperboard sheet of the type described which may be produced by means of a relatively simple and inexpensive process and with relatively simple apparatus. The accomplishment of the foregoing and additional objects will become more fully apparent hereinafter.

According to the invention, a low density high porosity paperboard sheet is provided by incorporating plastic microspheres into the pulp furnish used to form the paperboard. After the paperboard has been formed and dried, it is treated with an organic liquid which is a solvent for the plastic material of which the microspheres are formed. Upon further drying, the paperboard sheet attains a low density and greatly increased porosity, without adversely affecting its other mechanical properities. If desired, the treated sheet may be further subjected to heat treatment at elevated temperature in order to enhance certain physical properties.

The production of plastic microspheres is known in the art. Many different types are suitable. The following representative preparation is taken from Belgian Pat. No. 641,711, and is given by way of lilustration only and is not to be construed as limiting.

PREPARATION 1

Preparation of methylmethacrylate microspheres

There are charged to a polymerization reactor equipped with an agitator 100 parts of deionized water and fifteen parts of Ludox HS, an aqueous colloidal gell containing approximately 30% silica. To this mixture is added 2.5 parts of an aqueous solution of 10% solids of a copolymer prepared by subjecting equimolecular proportions of diethanolamine and adipic acid to a condensation reaction to obtain a product having a viscosity of about 100 centipoises at 25° C. There is added one part of a solution containing 2.5% solids of potassium dichromate. The pH of the aqueous solution is adjusted to 4 by means of hydrochloric acid. The methyl methacrylate is utilized as a monomer. A mixture is prepared in the form of an oil phase using 100 parts by weight of methyl methacrylate and containing 20% by weight of neopentane (27.6 percent by volume with respect to total volume of the mixture of monomer and neopentane) and 0.1 part of benzoyl peroxide as a catalyst. The mixture in the oil phase is added to the aqueous phase and violently agitated by means of a stirring vane turning at about 10,000 revolutions per minute. The reactor is immediately closed and a sample retained for determining the size of particles. It has been determined that the minute droplets have diameters of about 2 to 10 microns. After the initial dispersion, the reaction mixture is maintained at a temperature of about 80° C. for 24 hours. At the end of this time, the temperature is lowered and the reaction mixture assumes the appearance of a white chalky liquid latex. A portion of the mixture is filtered in order to separate the beads. The beads are then dried in an air oven at a temperature of about 30° C. A part of the dry beads are heated in an air oven at a temperature of 150° C. for about 3 minutes. After heating, the beads have a markedly enlarged volume. A microscopic examination of the beads before swelling indicates beads of about 2 to 10 microns in diameter contained in a spherical zone distinct from the liquid and a small vapor space. Microscopic examination of the beads after heating shows that they have diameters about 2 to 5 times larger than the initial beads and a relatively thin transparent cell wall with a gaseous center, that is to say that each bead is monocellular.

The following examples are given by way of illustration only and are not to be construed as limiting.

EXAMPLE 1

Preparation of low densty Fourdrinier paperboard

A plastic microsphere slurry having the following composition was first prepared utilizing methyl methacrylate microspheres prepared as described in preparation 1 above, in a Horn Broke beater.

Pounds of microspheres—236
Gallons of water—1,370
Pounds of water—11,800
Percent microspheres—2.0 by weight A pulp slurry was then prepared according to the following specifications:

Pulp—100% bleached Espanola jack pine
Size—2%
Alum—To pH of 4.5–5.0
Freeness—300 to paper machine At start-up the paper sheet was formed without the addition of microspheres in order that the heavy sheet could be taken over the machine at maximum strength. After a sheet having the correct weight was obtained (65 pounds), the slurry containing microspheres was added at the fan pump in an amount of approximately 5% microspheres based on O.D.[1] fiber. The sheet had a caliper of about 13 mils. The formed paper sheet was dried in conventional manner and its physical properties measured to give the values shown below. The sheet was then immersed in toluene for 90 minutes maintained at 100–200° F. The sheet was dried, its physical properties measured, and further conditioned by heating for 5 minutes in a 325° F. oven.

---
[1] O.D.=oven dry.

In Table I are listed data obtained from tests of the paperboard produced in Example 1, before treatment, after solvent treatment, and after heat treatment. Additionally, the table contains data obtained in experiments listed below as Examples 2–8 wherein the process described in Example 1 was repeated, but wherein the type of pulp, thickness of the paperboard, and percentage by weight of plastic microspheres were varied. In each case, the porosity is given in terms of Sheffield porosity values. Solvent treatment in each case comprised a 90 minute immersion in toluene at 180–200° F., with the samples being subsequently dried and reconditioned. In each case, where indicated, subsequent heat treatment comprised placing the sample for five minutes in an oven maintained at 325° F.

The plastic microspheres used in the present invention may be prepared from any suitable polymeric material such as methyl methacrylate, methyl methacrylate-acrylonitrile copolymers, styrene-acrylonitrile copolymers, phenolic resins, etc. Methyl methacrylate microspheres are preferred. The microspheres generally range in size from about 3 to about 130 microns and have an average apparent density of approximately 0.82 lb. per cubic foot.

The amount of plastic microspheres in the paper sheet may range from a very small amount to as much as 12% by weight. If the amount is too small, the porosity of the paper sheet is not increased sufficiently. On the other hand, amounts greater than about 12% may result in a deterioration in some of the physical properties of the paper sheet. Amounts of from about 1% to about 6% by weight are preferred.

teries. Numerous types of paper pulp and other types of paper-forming raw materials may obviously be utilized to form paper or paperboard sheets having various desired properties. When applying the present invention to cylinder board, the plastic microspheres may be incorporated into one or more or all layers of the cylinder board.

It is to be understood that the invention is not to be limited to the exact details of operation or exact materials shown and described, as obvious modifications and equivalents will be apparent to one skilled in the art, and the invention is therefore to be limited only by the scope of the appeded claims.

I claim:

1. A method for the preparation of a porous paper or paperboard sheet which comprises preparing an aqueous slurry comprising paper pulp and polymeric plastic microspheres, forming a paper sheet from said slurry, drying said sheet, and treating said paper sheet with an organic solvent to dissolve at least a portion of a number of said microspheres sufficient to increase the porosity substantially uniformly throughout said paper sheet.

2. A method according to claim 1 wherein said plastic microspheres are formed of methyl methacrylate.

3. A method according to claim 1 wherein said plastic microspheres are formed of a methyl methacrylate-acrylonitrile copolymer.

4. A method according to claim 1 wherein said plastic microspheres are formed of a styrene-acrylonitrile copolymer.

5. A method according to claim 1 wherein said plastic microspheres are formed of a phenolic resin.

TABLE I.—SOLVENT AND HEAT TREATMENT OF MICROSPHERE-CONTAINING FOURDRINIER BOARD

| Example | Pulp type | Percent by weight microspheres | Before treatment | | After solvent treatment | | After heat treatment | |
|---|---|---|---|---|---|---|---|---|
| | | | Caliper, inch | Porosity, Sheffield | Caliper, inch | Porosity, Sheffield | Caliper, inch | Porosity, Sheffield |
| 1 | Espanola Jack Pine | 5.3 | .0138 | 604 | .0125 | 1,400 | .0125 | 1,160 |
| 2 | do | 4.0 | .0088 | 379 | .0088 | 720 | .0085 | 500 |
| 3 | do | ¹0 | .0079 | 169 | .0078 | 185 | .008 | 165 |
| 4 | Bleached kraft | 2.0 | .020 | 600 | .0193 | 1,200 | | |
| 5 | do | ¹0 | .0118 | 540 | .0115 | 580 | | |
| 6 | Espanola Jack Pine | 12.0 | .035 | 962 | .0318 | 1,800 | .0325 | 1,530 |
| 7 | do | 6.0 | .0205 | 605 | .020 | 1,240 | .0205 | 960 |
| 8 | do | ¹0 | .0118 | 472 | .012 | 550 | .012 | 503 |

¹ Control.

Although toluene is the solvent utilized in the examples described above, any organic solvent, such as benzene, xylene, acetone, etc., which is a solvent for the particular plastic material utilized to form the microspheres, may be used. Although immersion in the solvent is the preferred procedure for dissolving a portion of the plastic microspheres, other equivalent procedures capable of effecting the same result, such as spraying, submergingly translating, or the like may also be employed.

The low density high porosity paper or paperboard of the present invention may be used for many applications. It may be used to produce controlled porosity filter paper, the porosity being controllable by varying the content and size of the microspheres and the degree of treatment in the organic solvent and subsequent drying. The paper or paperboard may also be used to fabricate products requiring a relatively high degree of heat insulation, as for example paper cups to be used for hot beverages. Additionally the paper or paperboard sheets of the present invention may be used for applications such as the fabrication of battery separators for various types of bat- 6. A method according to claim 1 wherein said plastic microspheres are present in said paper sheet in an amount up to about 12% by weight.

7. A porous paper or paperboard sheet comprising paper pulp and having a plurality of polymeric plastic microspheres dispersed therein, said paper sheet having been treated with an organic solvent to dissolve at least a portion of a number of said microspheres sufficient to increase the porosity substantially uniformly throughout said paper sheet.

References Cited

UNITED STATES PATENTS

| 3,157,566 | 11/1964 | Brafford | 162—164 |
| 3,293,114 | 12/1966 | Kenaga | 162—168 |

S. LEON BASHORE, Primary Examiner

R. H. ANDERSON, Assistant Examiner

U.S. Cl. X.R.

136—120; 162—138, 165, 183; 210—496, 505, 510